April 7, 1931. H. R. VILLARREAL 1,800,164
AEROPLANE
Filed March 3, 1930
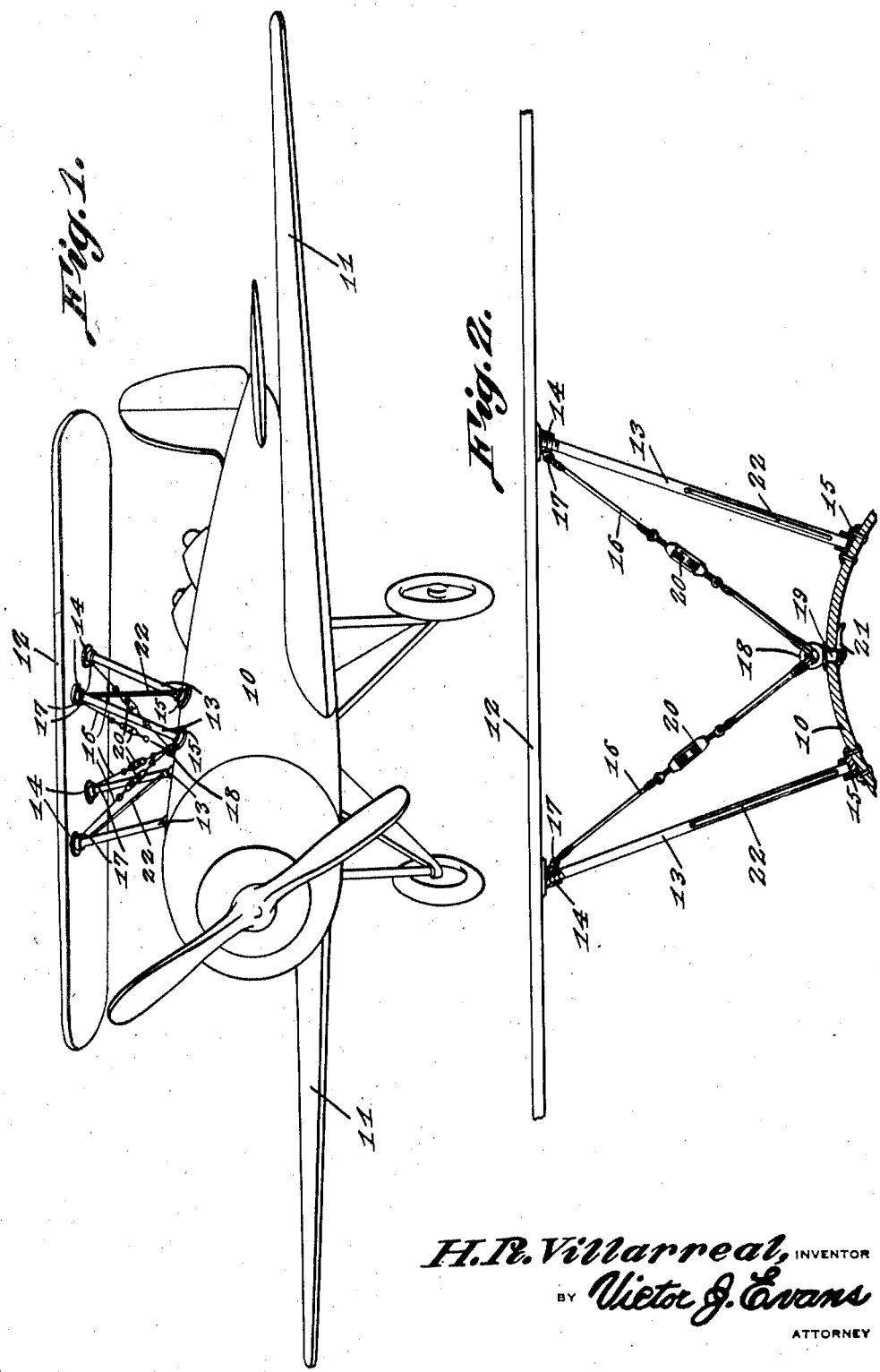

Patented Apr. 7, 1931

1,800,164

UNITED STATES PATENT OFFICE

HUMBERTO RAMIREZ VILLARREAL, OF NEW YORK, N. Y.

AEROPLANE

Application filed March 3, 1930. Serial No. 432,879.

This invention relates to improvements in aeroplane, an object being to provide means for increasing the wing spread, and consequently the lifting power of an aeroplane, especially at the "take off".

As is well known, a heavily loaded aeroplane cannot "take off" easily from an aeroplane carrier or other restricted places, so that the load must be sacrificed to permit of a fairly safe take off. This is a handicap in that the reduction of a load necessarily reduces the amount of fuel carried, and consequently, the flight or cruising range of the aeroplane is accordingly reduced. The present invention overcomes the above and other disadvantages by providing an auxiliary wing which is detachably secured in place for the initial flight under a heavy load, and which may be quickly and conveniently released when the load is reduced, so as to reduce resistance and increase the speed of the plane.

With the above and other objects, the invention further consists in the following novel features and details of construction to be hereinafter more fully described and pointed out in the appended claims.

In the drawings Figure 1 is a prospective view of an aeroplane equipped with the invention. Figure 2 is an enlarged fragmentary sectional view illustrating the manner of attaching the auxiliary wing.

Referring in detail to the drawings wherein like characters of reference denote corresponding parts, the invention is shown as applied to a monoplane. The fuselage of the aeroplane is indicated at 10, while the permanent wings are indicated at 11. These wings extend laterally from the fuselage adjacent the lower portion, while an auxiliary wing 12 is mounted above the fuselage and extends transversely of the same.

This auxiliary wing or airfoil 12 carries struts 13 which are secured to the underface of the wing 12. For this purpose sockets 14 are attached to the wing and the ends of the struts 13 are threaded into the sockets. Any other suitable means may be employed for attaching the struts to the wing 12, the purpose being to provide a unitary structure which includes the wing and the struts.

Secured to the fuselage 10 are socketed members 15, and the lower ends of the struts 13 are removably positioned within these socketed members so as to permit of the ready separation of the struts from the fuselage.

In order to retain the struts within the sockets and thus provide for the attachment of the auxiliary wing, the invention provides rods or cables 16 which have one of their ends secured within eyes 17 carried by the members 14. The opposite ends of these rods or cables are attached to an eye 18. This last mentioned eye is carried at the outer end of a shank 19 which extends through an opening provided in the fuselage. Turnbuckles 20 may be included in the rods or cables 16 so as to individually regulate their length.

In order to provide for a quick detachable engagement of the eye 18 with the fuselage, the shank 19 carries a latching element 21 which is so constructed and mounted that it may be readily moved pivotally. When moved in one direction this latching element will be positioned to release the eye so that the wing 12, the struts 13 and the rods or cables 16 will be free of the fuselage. When moved pivotally in an opposite direction, the latching element 21 will securely retain the shank within the fuselage opening and thereby securely hold the wing attached to the aeroplane. Braces 22 which extend from the upper ends of the forward struts 13 to the lower ends of the rear struts serve to reenforce and increase the rigidity of the structure.

Through the use of the auxiliary wing or airfoil, increased lifting power is provided so that the aeroplane will take the air within a much shorter distance. This will permit of the carrying of an increased load, so that more fuel may be carried during the initial portion of the flight. This is especially useful where an increased cruising radius is necessary. For example, if the aeroplane without the auxiliary wing will conveniently take off with just sufficient fuel for 50 hours of flight, this amount of fuel may be increased (say for 75 hours flight) with the use of the auxiliary wing. Should the occasion arise where increased speed is essential, the auxiliary wing may be released after the plane has flown approximately 25 hours, so that the remainder of the flight may be made with the ordinary plane equipment. Therefore, in an emergency, the auxiliary wing may be released so that wind pressure will carry this wing upward a sufficient distance to clear the rear portion of the aeroplane structure.

It is of course obvious that the wing 12 will be released in flight only in an emergency and will only be used to provide increased lifting power for purposes above stated.

This invention is susceptible of various changes in its form, proportions and minor details of construction, and the right is herein reserved to make such changes as properly fall within the scope of the appended claims.

Having described the invention what is claimed is:

1. An aeroplane including a fuselage having main wings, an auxiliary wing arranged transversely of the fuselage and in a plane above the main wings, pairs of struts secured to the auxiliary wing, socketed members secured to the fuselage to receive the struts for detachably connecting said struts to the fuselage, a shank extending through the wall of the fuselage, securing elements connecting the shank to the auxiliary wing, and a movable fastener carried by the shank and when in one position adapted to secure the shank to the fuselage and when in a second position to release the shank from the fuselage to permit separation of the auxiliary wing and struts from the fuselage while in flight.

2. An aeroplane including a fuselage having main wings, an auxiliary wing arranged transversely of the fuselage and in a plane above the main wings, attaching members secured to the auxiliary wing, struts secured to the attaching members, socketed members secured to the fuselage and receiving the struts to detachably connect said struts to the fuselage, a shank extending through the wall of the fuselage, adjustable securing elements connected to the shank and to the attaching members, and a movable fastener pivoted to the shank and when in one position adapted to secure the shank to the fuselage and when in a second position to release the shank from the fuselage for permitting separation of the auxiliary wing and struts from said fuselage.

HUMBERTO RAMIREZ VILLARREAL.